United States Patent Office 3,544,511
Patented Dec. 1, 1970

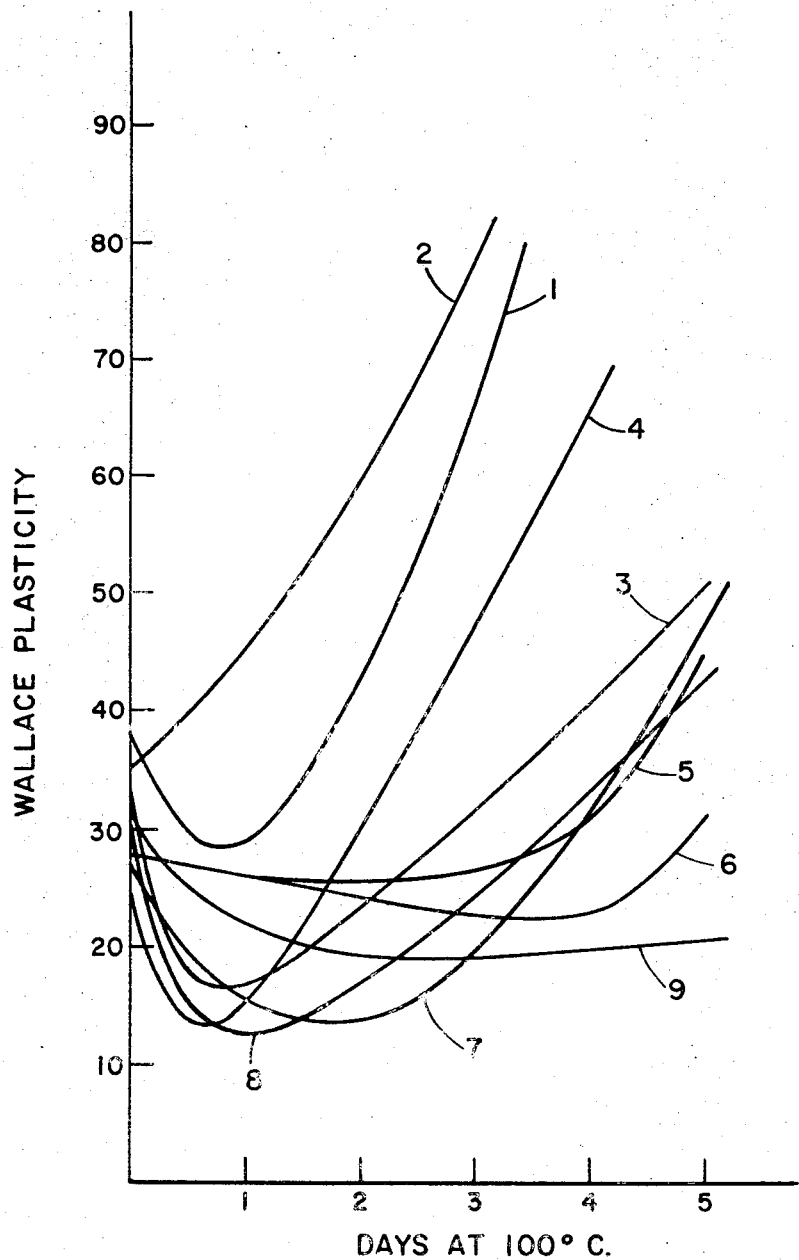

---

3,544,511
HYDROXYARYLTHIOARYL PHOSPHITE STABILIZERS FOR RUBBER
Alan Jeffrey Neale, and Peter James Stratford Bain, Llangollen, Wales, assignors to Monsanto Chemicals Limited, London, England, a British company
Filed Dec. 18, 1967, Ser. No. 691,120
Claims priority, application Great Britain, Dec. 20, 1966, 56,944/66
Int. Cl. C08f 45/58
U.S. Cl. 260—45.95     2 Claims

ABSTRACT OF THE DISCLOSURE

Phosphite esters having the formula:

$$(RO)_xP(OR')_{3-x}$$

where R represents a radical comprising at least two aromatic nuclei, the oxygen atom of the group (RO) being linked to a nuclear carbon atom of one such nucleus, at least one pair of the said nuclei are linked through a sulfur atom, and at least one nucleus has a hydroxyl group as a nuclear substituent, R' represents an aromatic or aliphatic radical, and $x$ has the value 1, 2, or 3 stabilize rubbers, particularly synthetic rubbers produced by aqueous emulsion polymerization of styrene and butadiene.

---

This invention relates to synthetic rubber compositions having improved storage life.

Most unvulcanised synthetic rubbers undergo deterioration on storage unless a protective agent or stabiliser is added, and in many instances the deterioration is characterised by the formation of gel—that is regions in a rubber that have become hard and where rubbery properties have been lost. Gel formation can sometimes be observed as the hardening and cracking of the surface of a rubber.

Of the materials that have been proposed as stabilisers for unvulcanised synthetic rubbers, many of the effective ones suffer from the disadvantage that they discolour the rubber, so that they are not suitable for use where light-coloured rubber products are required. Those that do not discolour are generally such that they do not survive subsequent vulcanisation of the rubber, so that there is no carry-through of protective activity.

We have now discovered that a certain group of chemical compounds are effective, substantially non-discolouring stabilisers for synthetic rubbers. Moreover, vulcanised rubber produced from synthetic rubbers containing the stabilisers are protected to a significant extent against oxidation deterioration.

The stabilisers are phosphite esters having the formula:

$$(RO)_xP(OR')_{3-x}$$

where R represents a radical comprising at least two aromatic nuclei, the oxygen atom of the group (RO) being linked to a nuclear carbon atom of one such nucleus, at least one pair of the said nuclei are linked through a sulphur atom and at least one nucleus has a hydroxyl group as a nuclear substituent, R' represents an aromatic or aliphatic radical, and $x$ has the value 1, 2 or 3. The invention accordingly comprises an unvulcanised rubber containing a stabilising amount of such an ester.

In a typical instance, R in the formula of the ester is a hydroxyarylthio aryl radical, and R' is an aryl or alkaryl radical, so that the hydroxyphenylthiophenyl di-(nonylphenyl) phosphites are representative of the stabilisers of the present invention.

The aromatic nuclei in the radical R are generally benzene nuclei, and in a preferred class of phosphites, each radical R can be represented by the general formula:

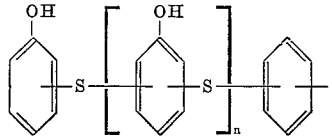

where $n$ is 0 or an integer, generally not exceeding 10, and where there can optionally be present in any of the benzene nuclei one or more nuclear substituents, for example halogen atoms or alkyl groups.

In a particularly useful class of phosphites, each R is a radical having the above formula with $n=0$, that is to say a hydroxyphenylthiophenyl radical, in which each phenyl nucleus is either unsubstituted (apart from the hydroxyl group) or contains one or two alkyl groups. Such alkyl groups usually contain not more than 8 carbon atoms.

Other radicals R falling within the general definition above are those where the aromatic nuclei in the radical are or include naphthalene nuclei, and those comprising a sequence of aromatic nuclei, for example benzene nuclei, in which one or more adjacent pairs of nuclei are linked directly, or through, for example, an oxygen atom or an alkylene group (provided that at least one pair is linked through a sulphur atom).

When aromatic, a radical R' is generally an aryl or substituted aryl group, more particularly a phenyl or substituted phenyl group. Substituents which can be present in a substituted aryl group include halogen atoms, alkyl (including cycloalkyl) groups, and aralkyl groups. In preferred phosphites R' (or each R') is a phenyl group or a substituted phenyl group containing from 1 to 4 substituents selected from alkyl groups of up to 12 carbon atoms, for example methyl, ethyl, isopropyl, tert-butyl, hexyl, octyl, nonyl and dodecyl, aralkyl groups selected from benzyl, α-methylbenzyl, α,α-dimethylbenzyl, α-ar-dimethylbenzyl and ar-chloro-α-methylbenzyl where ar indicates substitution in the benzyl nucleus, and cycloalkyl groups selected from cyclohexyl and alkylcyclohexyl containing up to 10 carbon atoms, for example α-methylcyclohexyl. Of the substituted phenyl groups R', the most preferred are (a) those containing from 1 to 3 substituents selected from alkyl groups of up to 4 carbon atoms and α-methylbenzyl groups and (b) alkylphenyl groups where the alkyl group contains from 4 to 12 carbon atoms.

Suitable aliphatic radicals from which R' can be selected generally contain at least 4 carbon atoms, preferably from 6 to 20 carbon atoms, and include straight and branched chain aliphatic, cycloaliphatic and aryl-substituted aliphatic radicals.

Certain of the phosphites of the class represented by the general formula $(RO)_xP(OR')_{3-x}$ are new materials. These include all cases where $x$ is 1 or 2, and phosphites of the formula $(RO)_3P$ where the aromatic nuclei of each radical R are free from alkyl substituents.

The phosphite esters of the formula $(RO)_3P$ can be made by the reaction of a phenol R—OH with a phosphorus trihalide, generally phosphorus trichloride. Substantially equivalent quantities of the reactants, i.e. substantially 3 moles of the phenol per mole of phosphorus trihalide, can be employed, or an excess of the phenol, for example up to a 5-fold excess, can be used. Excess phenol can be recovered from the reaction product if desired, but products containing both phosphites (RO)$_3$P and phenols ROH can be used as stabilisers. Mixed phosphite esters, i.e. those in which $x$ has the value 1 or 2, can be made by the reaction of a mixture of a phenol ROH and a phenol or alcohol R'OH in appropriate molar proportions with a phosphorus trihalide, by the reaction of a phenol ROH with a phosphorus ester halide of the formula X$_x$P(OR')$_{3-x}$ where X represents a halogen atom, usually chlorine, and $x$ has the value 1 or 2, or by a transesterification reaction in which a phosphite ester having the formula (R'O)$_3$P is heated with from 1 to 2 molar proportions of a phenol ROH until the quantity of the phenol or alcohol R'OH displaced is at least 80% but not more than 120% of the equivalent of the phenol ROH used. The transesterification reaction is of particular applicability to the production of phosphite esters having the formula (RO)P(OR')$_2$ by heating substantially equimolar quantities of the phenol ROH and a phosphite (R'O)$_3$P until from 0.85 to 1.15 molar proportions of the phenol or alcohol R'OH have been displaced.

Some processes can give rise to a mixture of compounds; for example the product obtained by the reaction of a mixture of a phenol ROH and a phenol or alcohol R'OH with a phosphorous trihalide may contain a proportion of each of the tri-esters (RO)$_3$P and (R'O)$_3$P as well as mixed esters in which the esterifying groups are different. Such mixtures are, however, effective stabilizers, and the isolation of individual components is unnecessary and usually uneconomic.

For the production of phosphites in which R is a hydroxyphenylthiophenyl radical, the appropriate phenol ROH is a thiobis(phenol). A wide variety of suitable thiobis(phenols) are known, including for instance 2,2'-thiobis(phenol), 4,4'-thiobis(phenol), 2,2' - thiobis(4-t-butylphenol); 2,2'-thiobis(4,6 - dimethylphenol); 2,2'-thiobis(4,6 - diisopropylphenol); 2,2' - thiobis(4,6-di-t-butylphenol); and 4,4'-thiobis(2-t-butyl-5-methylphenol).

Useful starting materials can be obtained by heating phenol with less than an equivalent amount of sulphur in the presence of a small quantity of an alkali metal phenate, for instance sodium phenate. The ratio of phenol to sulphur used is usually from 1.5 to 10, and preferably from 1.75 to 6 gram moles of phenol per gram atom of sulphur, while the alkali metal phenate may be the molar equivalent of from one hundredth to one twentieth of the phenol present. The products thus obtained consist largely of mixtures of 2,2'-, 2,4'- and 4,4'-thiobis (phenols) which can be used to produce phosphite ester products without separation of the individual thiobis(phenols).

Starting materials that contain phenol sulphides having three or more benzene nuclei per molecule can be obtained by the reaction of phenol and sulphur under other conditions, for example in the presence of a catalytic amount of phosphorus pentoxide or a Friedel-Crafts catalyst such as zinc chloride or aluminium chloride.

For the production of phosphites in which R' is a phenyl or substituted phenyl radical, appropriate starting materials include phenol, cresols, xylenols, (α-methylcyclohexyl)phenol and α-methylbenzylated phenols and cresols. A particularly useful material is a mixture of α-methylbenzylated phenols made by the arakylation of phenol with approximately 2 molar proportions of styrene in the presence of an aralkylation catalyst, for example sulphuric acid. Under normal reaction conditions the product of this reaction contains a small amount of unreacted phenol and the following α-methylbenzylated phenols: 2(α-methylbenzyl)phenol; 4(α-methylbenzyl)phenol; 2,4-bis (α-methylbenzyl)phenol; 2,6-bis(α-methylbenzyl)phenol; and 2,4,6-tris(α-methylbenzyl)phenol. Mixtures of α-methylbenzylated phenols obtained by the aralkylation of phenol with other proportions of styrene, for example from 1 to 2.5 moles of styrene per mole of phenol may also be used. The phosphites (R'O)$_3$P corresponding to any of the aforementioned phenols can be used where the phosphites of the invention are produced by a transesterification reaction.

Reactions employing a phosphorus trihalide or phosphorus ester halide can, if desired, be conducted in an inert solvent medium, for example ether or benzene, and optionally in the presence of an acid-acceptor, for example pyridine, an alkylpyridine, quinoline, or a dialkylaniline. Where no solvent is employed, the reaction temperature is usually within the range 100 to 250° C., more particularly from 150 to 200° C. Reactions in a solvent can be carried out at temperatures from ambient or below (for example —10° C.) to the boiling point of the solvent. Reactants and solvents are preferably substantially anhydrous and the processes, especially those at temperatures above 100° C., should preferably be conducted in an inert atmosphere.

Transesterification reactions are usually carried out at pressures below atmospheric to facilitate removal from the system of the alcohol or phenol R'OH that is displaced, and at reaction temperatures of from 100 to 250° C., more particularly from 150 to 200° C.

The phosphite esters of the invention can be used alone to stabilize rubber or can be used in admixture with other phosphite ester stabilizers, for example tri(nonylphenyl)phosphite, phosphite esters wherein one or more ester groups are derived from dihydroxybenzenes, dihydroxyalkylbenzenes, oxybis(alkylphenols) or alkylenebis(alkylphenols), or in admixture with one or more phenolic antioxidants. In such admixtures, the preferred phenolin antioxidants are those that are liquid at ordinary temperatures. These include products obtainable by the aralkylation of phenols with styrene, as referred to above in connection with the production of certain phosphite esters of the invention.

The present stabilizers are particularly suitable for the preservation of rubbers that are produced by an aqueous emulsion polymerization process, for example styrene-butadiene rubber or butadiene-acrylonitrile rubber, and in such cases the stabiliser can in some instances be added as an aqueous solution of a water soluble salt, for example the sodium salt, and co-precipitated as the free phenolic ester with the rubber on coagulation of the latex by acidification. Alternatively the phosphite ester itself, usually formulated as an emulsion, can be added to the rubber latex. Where the rubber is produced by polymerising the appropriate monomer or monomers in solution, this solution can be treated with a solution of a phosphite ester in a suitable solvent before the solid rubber is isolated. A further way in which a stabilizer can be incorporated into the rubber is by milling in the conventional manner.

The amount of the stabiliser used in the rubber can vary between wide limits, for example from 0.1 to 5 parts per 100 parts of rubber, but in general it has been found preferable to use from 0.2 to 3 parts by weight and particularly from 0.5 to 2.5 parts by weight, per hundred parts by weight of rubber.

A synthetic rubber containing a stabiliser can be vulcanised by a conventional process appropriate to the particular synthetic rubber concerned.

The invention is illustrated by the following examples.

EXAMPLE 1

This example describes the production of a phosphite ester by the transesterification of triphenyl phosphite with 2,2'-thiobis(phenol).

A mixture of 21.8 grams (0.1 mole) of 2,2'-thiobisphenol and 31.0 grams (0.1 mole) of triphenyl phosphite was heated at a pressure of 20 mm. of mercury in an oil bath at a temperature of 160° C.–180° C., so that phenol was distilled from the reaction mixture. After two hours, 10.4 grams (0.11 mole) of phenol had been collected. The residue was a pale yellow oil. In a comparative experiment, the above procedure was repeated except that heating was continued until 13.5 grams (0.14 mole) of phenol had been collected, giving a product believed to consist mainly of condensed polyphosphite esters.

EXAMPLE 2

This example describes the production of a phosphite ester by the reaction of a mixture of phenols with phosphorus trichloride.

A mixture of 21.8 grams of 2,2'-thio-bis(phenol), (0.1 mole), and 18.8 grams of phenol, (0.2 mole) was stirred at 100° C. while 8.7 cc. of phosphorus trichloride, (0.1 mole), were added over a period of an hour. The temperature was then raised to 160° C.–180° C. for a further 3 hours. The hydrogen chloride evolved was trapped in water, which on titration with 0.1 N sodium hydroxide solution indicated 0.31 mole of acid evolved.

The product was a colourless oil which solidified on cooling.

EXAMPLE 3

This example describes the production of a phosphite ester by the reaction of a mixture of phenols with phosphorous trichloride.

A mixture of 21.8 grams of 2,2'-thio-bis(phenol), (0.1 mole), and 44.0 grams of nonyl phenol, (0.2 mole), was stirred at 100° C. under nitrogen while 8.7 cc. of phosphorus trichloride, (0.1 mole), were added over a period of one hour. The mixture was heated to 160° C.–180° C. for 3 hours when 0.299 mole of hydrogen chloride had been evolved.

On cooling the product partly solidified.

EXAMPLE 4

A mixture of 21.8 grams of 4,4'-thiobisphenol (0.1 mole) and 44.0 grams of nonyl phenol, (0.2 mole), was stirred at 100° C. under nitrogen while 8.7 cc. (0.1 mole) of phosphorous trichloride were added over a period of one hour.

The temperature was raised to 160° C.–180° C. for three hours. At the end of this time 0.298 mole of hydrogen chloride had been evolved.

The phosphite ester product was 67.4 grams of a yellow oil.

EXAMPLE 5

This example describes the production of mixed thiobisphenols and phosphite esters of the invention derived therefrom.

(1) Preparation of the mixed thiobisphenols—40 grams of sodium hydroxide, (1.0 mole), were dissolved in 3,760 grams of 98 percent phenol (40 moles) and 256 grams of sulphur (8.0 gram atoms) were added. The mixture was heated to 180° C. with stirring, under nitrogen, and the hydrogen sulphide evolved was trapped in sodium hydroxide solution. After 5½ hours at 180° C., 4.0 moles of hydrogen sulphide had been evolved and the reaction had substantially stopped. The reaction mixture was cooled to 80° C. and anhydrous hydrogen chloride was passed in to neutralise the sodium hydroxide.

2,480 grams of phenol were distilled from the reaction mixture at a pressure of 15 mm. and the residue was then washed with water to remove sodium chloride. The residual oil was further distilled at a pressure of 10 mm., with stirring, to remove a further 300 grams of phenol. The residue, which weighed 730 grams, solidified.

Vapour phase chromatography showed that the product, hereinafter referred to as "mixed thiobis(phenols)," contained about 7 percent of residual phenol while the balance consisted essentially of 2,2'-thiobisphenol, 4,4'-thiobisphenol and 2,4-thiobisphenol.

(2) The preparation of phosphite esters of the invention from the mixed thio-bisphenols prepared as described above—Sufficient of the sulphur/phenol reaction product described above, to contain two moles of the mixture of thio-bisphenols was mixed with one mole of nonyl phenol and heated to 100° C.–110° C. with stirring, under an atmosphere of nitrogen. One mole of phosphorus trichloride was then added during a period of two hours, at the end of which the temperature of the mixture was slowly raised to 150° C. over a period of 1 hour. The temperature was held at 150° C.–160° C. for three hours longer and then the pressure was reduced to 10 mm. at 150° C. for a further 1½ hours to remove any phenol and traces of hydrogen chloride.

EXAMPLE 6

Using essentially the same method as that described in part 2 of Example 5, an ester was obtained by the reaction of 3 molar proportions of the mixed thiobis-(phenols) described in part 1 of Example 5 with one molar proportion of phosphorus trichloride.

EXAMPLE 7

A phosphite ester was obtained by heating one molar proportion of the mixed thiobis(phenols) of Example 5 with one molar proportion of triphenyl phosphite at 150° m.–160° C. at a pressure of 15 mm. of mercury until 1.1 molar proportions of phenol had distilled from the mixture.

EXAMPLE 8

This example describes the production of a sulphurised phenol starting material and its conversion to a phosphite ester of the invention.

(1) 0.5 gram of sodium was dissolved in 94.0 grams (0.1 mole) of phenol with stirring and heating to 80° C. When solution was complete, 16.0 grams (0.5 gram atom) of sulphur was added and the mixture heated to reflux (193° C.). Gases were swept out by a current of nitrogen and absorbed in 5 N sodium hydroxide solution in a scrubber. After 4½ hours at the reaction temperature, analysis of the scrubber contents showed that 0.25 mole of hydrogen sulphide had been evolved. The reaction mixture was processed by a procedure similar to that described in Example 5 to give a mixture of sulphurised phenols.

(2) The sulphurised phenols were cooled to 100° C. and 13.75 grams (0.1 mole) of phosphorus trichloride were then added with stirring over a period of 1 hour. Stirring at 100° C.–110° C. was continued for a further hour, the temperature raised to 160° C. over the next hour, held at 160° C. for an hour and then taken to 192° C. for a further 1½ hours. The product was then allowed to cool under nitrogen. The product was a white, opaque mobile oil which slowly deposited sodium chloride.

EXAMPLE 9

The process described in Example 8 was repeated except that 0.2 mole of phosphorous trichloride was used in part 2. The product was a white, mobile oil.

EXAMPLE 10

A sulphurised phenol giving an analysis corresponding to the formula:

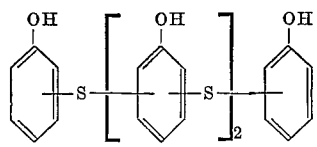

was obtained by heating 1.0 mole of phenol with 1.2 gram atoms of sulphur in the presence of a catalytic amount of phosphorus pentoxide.

By heating one molar proportion of this sulphurised phenol with two molar proportions of triphenyl phosphite at 150° C.–160° C. under reduced pressure until two molar proportions of phenol had distilled from the reaction mixture, a phosphite ester, believed to have the structure

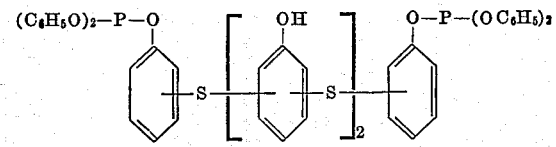

was obtained.

EXAMPLE 11

This example describes the production of a di[4(4'-hydroxyphenyl)thiophenyl]nonylphenyl phosphite.

A solution of 43.6 grams (0.2 mole) of 4,4'-thiobis-(phenol) and 32.1 grams (0.1 mole) of nonylphenyl phosphorodichloridite in 120 cc. of benzene was stirred while nitrogen was passed through the liquid and benzene was distilled from the reaction mixture. After removal of the benzene, the temperature was raised to 190° C. over a period of 3 hours, and then held at 190° C.–200° C. for a further 40 minutes. The product obtained on cooling was a pale yellow solid.

EXAMPLE 12

A di[2(2'-hydroxyphenyl)thiophenyl] nonylphenyl phosphite was obtained by essentially the same method as that described in Example 11, but using 2,2'-thiobis-(phenol) in place of 4,4'-thiobis(phenol).

EXAMPLE 13

This example illustrates the use of phosphite esters of the invention as stabilisers for styrene-butadiene rubber.

The effectiveness of the stabiliser was assessed by recording the time taken for the entire surface of a sample of rubber containing the stabiliser to harden and crack, in comparison with a similar sample of rubber containing no stabiliser, and with a sample containing a known stabiliser, phenyl beta-naphthylamine.

0.1 gram of the phosphite ester composition was milled at room temperature into 10 grams of a styrene-butadiene rubber containing no other additive. When mixing was complete, the rubber was pressed out to a sheet having a thickness of 5 thousandths of an inch and was provided on one side with a backing of aluminium foil. Strips were cut from the laminate thus obtained and placed in an air oven at 100° C. Other strips were prepared in a similar manner contained respectively no additive, phenyl beta-naphthylamine and tri(nonylphenyl) phosphite, the last two additives being known stabilisers for synthetic rubber.

Strips were removed from the oven at intervals and the extent of resinification of the rubber was assessed by visual examination of the exposed surfaces.

In the following chart the results of these tests are set forth. The phosphite esters of the invention are designated by the number of the example in which their preparation is described.

| Stabiliser | Hours at 100° C. to surface resinification | Colour rating |
|---|---|---|
| 1 | >48 | 1 |
| 2 | >48 | 1 |
| 3 | 20 | 2 |
| 4 | >48 | 1 |
| 7 | 35½ | 2 |
| 8 | 23 | 2 |
| 9 | 23 | 2 |
| 11 | >40 | 3 |
| 12 | 36 | 2 |
| Phenyl beta naphthylamine | >48 | 5 |
| Tri(nonylphenyl)phosphite | 15 | 2 |
| Blank | 7 | 2 |

In a further test, the effectiveness of the stabilisers was assessed by milling 1.2 parts by weight of stabiliser into 100 parts by weight of dried, unprotected styrene-butadiene rubber, aging samples of the mixture in an oven at 100° C. and determining the Wallace plasticity of the samples after various periods of aging. Each figure given for plasticity in the table below represents the mean of four separate measurements.

WALLACE PLASTICITY AFTER AGING AT 100° C.

| Example No. | Days | | | | | | | | Colour |
|---|---|---|---|---|---|---|---|---|---|
| | 0 | 0.33 | 0.66 | 1 | 2 | 3 | 6 | 10 | |
| 1 | 27 | 24 | 26 | 23 | 53 | 55 | 90 | 99 | 1–2 |
| 2 | 27 | 27 | 26 | 27 | 32 | 25 | 70 | 90 | 1 |
| 3 | 27 | 26 | 27 | 27 | 29 | 42 | 86 | 90 | 2 |
| 4 | 26 | 24 | 27 | 25 | 34 | 27 | 84 | 90 | 1 |
| 7 | 28 | 27 | 28 | 28 | 29 | 27 | 72 | 90 | 2 |
| Phenyl beta naphthylamine | 27 | 18 | 14 | 14 | 30 | 28 | 90 | 90 | 5 |

From the results given above, it is apparent that the phosphite esters of the invention in many cases confer protection comparable with that provided by phenyl beta naphthylamine while giving rise to significantly less discolouration of the rubber. However, a colour rating of 3 was observed with styrene-butadiene rubber containing 1.2 parts per 100 of dry rubber of the polyphosphite produced in the comparative experiment of Example 1.

EXAMPLE 14

This example describes the production of a mixture of 4(4' - hydroxyphenylthio)phenyl di[(alpha - methylbenzylated)phenyl] phosphites.

151 grams (0.5 mole) of a product obtained by the reaction of 2 molar proportions of styrene with 1 molar proportion of phenol in the presence of a catalytic amount of sulphuric acid and containing 8.8% of 2(α-methylbenzyl)phenol, 2.4% of 4(α-methylbenzyl)phenol, 24.1% of 2,4-bis(α-methylbenzyl)phenol, 23.4% of 2,6-bis(α-methylbenzyl)phenol, and 41.1% of 2,4,6-tris(α-methylbenzyl)phenol, was stirred at room temperature in a reaction vessel equipped with gas inlet and outlet, while 34.4 grams (0.25 mole) of phosphorus trichloride were added during 10 minutes. A slow stream of nitrogen was led into the vessel and the exit gases were passed into a scrubber containing water. Stirring was continued at room temperature for a further 16 hours after which the reaction mixture was heated to 190° C. for 3 hours. Titration of the scrubber contents at the end of this time showed that a total of 0.48 mole of hydrogen chloride had been evolved.

The reaction mixture was cooled to 120° C., 54.5 grams (0.25 mole) of 4,4'-thiobisphenol were added and the temperature of the mixture was then increased to 190–200° C. This temperature was maintained for 16 hours, at the end of which time titration of the scrubber contents showed that a total of 0.74 mole of hydrogen chloride had been evolved. Further heating for 2½ hours at 190° C. gave only a trace of hydrogen chloride. The product a pale yellow oil, very viscous at room temperature.

Calculated for $C_{56}H_{51}O_4PS$ (percent): C, 79.06; H, 6.04; P, 3.64. Found (percent): C, 78.62; H, 5.99; P, 3.11.

EXAMPLE 15

This example describes the production of 4(4'-hydroxy-3'-methylphenylthio)-2-methylphenyl di(2-methylphenyl) phosphite.

(a) Preparation of di(2-methylphenyl)phosphorochloridite 228 grams of o-cresol (2.1 mole) were stirred under nitrogen while 150 grams of phosphorus trichloride (1.09 mole) were added dropwise over one hour and stirred for a further hour at room temperature, when the total amount of hydrogen chloride evolved was 1.5 mole. The temperature was raised to 100° C. for a further hour when a further 0.5 mole of hydrogen chloride was evolved. The reaction product was then distilled to give a fore-run and a main fraction having a boiling range of 143–146° C./0.35 mm. of mercury (95.0 g.).

(b) Reaction of di(2-methylphenyl)phosphorochloridite with 4,4'-thiobis(2-methylphenol)

49.0 grams of 4,4'-thiobis(2-methylphenol) (0.2 mole) and 15.8 grams anhydrous pyridine (0.2 mole) were dissolved in 200 cc. of anhydrous ether. The flask containing the solution was purged with nitrogen and cooled in an ice bath. 56.0 grams of di(2-methylphenyl)phosphorochloridite (0.2 mole) were then added dropwise over half an hour and the mixture stirred for a further 3½ hours. Pyridine hydrochloride was then filtered off and the ether was distilled from the filtrate. The residual oil was held at 100° C. at a pressure of 10 mm. of mercury for 30 minutes to give 71.0 grams of 4(4'-hydroxy-3'-methylphenylthio)-2-methylphenyl di(2-methylphenyl) phosphite as a pale yellow very viscous oil.

$C_{28}H_{27}O_4PS$ requires (percent): C, 68.54; H, 5.55; P, 6.31. Found (percent): C, 68.10; H, 5.55; P, 6.70.

EXAMPLE 16

This example describes the production of 4(3',5'-dimethyl-4'-hydroxyphenylthio)-2,6-dimethylphenyl di(2,6-dimethylphenyl)phosphite.

Di(2,6-dimethylphenyl)phosphorochloridite was prepared from 2,6-dimethylphenol and phosphorus trichloride in an analogous manner to the phosphorochloridite of the previous example, except that the evolution of hydrogen chloride continued for about 20 hours at 100° C. The product distilled over the range 174–184° C. at a pressure of 0.5 mm. of mercury.

4(3',5'-dimethyl-4'-hydroxyphenylthio)-2,6-dimethylphenyl di(2,6-dimethylphenyl)phosphite was obtained as a pale brown viscous oil by the reaction of di(2,6-dimethylphenyl) phosphorochloridite with 4,4'-thiobis(2,6-dimethylphenol) in the presence of pyridine, reaction conditions being similar to those used for the preparation of the phosphite in Example 15.

EXAMPLE 17

4(4'-hydroxy-3'-methyl-5'-tert-butylphenylthio)-2-methyl-6-tert-butylphenyl di(2-methylphenyl)phosphite was prepared by the reaction of di(2-methylphenyl)phsophorochloridite with 4,4'-thiobis(2-methyl-6-tertbutylphenol) in the presence of anhydrous pyridine.

EXAMPLE 18

4(4'-hydroxy-2'-methyl-5'-tert-butylphenylthio)-3-methyl-6-tert-butylphenyl di(2-methylphenyl)phosphite was prepared by the reaction of di(2-methylphenyl) phosphorochloridite with 4,4'-thiobis(2-methyl-5-tert-butylphenol) in the presence of anhydrous pyridine.

EXAMPLE 19

This example describes the evaluation of the phosphite esters of some of the previous examples as stabilisers for synthetic rubber, and includes the method used to assess the hydrolytic stabilities of the stabilisers.

An emulsion of the phosphite ester was prepared by the slow addition of a solution of 12.5 grams of the phosphite ester and 1.0 gram of oleic acid in 12.5 grams of xylene to a vigorously stirred solution of 4 cc. of normal sodium hydroxide in 71 cc. of distilled water.

One series of tests were conducted on the freshly prepared stabiliser emulsion and a second series of tests on emulsion after storage (with agitation) for 7 days at room temperature. In each case evaluation of stabiliser activity was as follows:

8.0 grams of the emulsion was stirred into 440 cc. of a 1502 SBR latex previously heated to 45–50° C. and the latex creamed by the addition of 147 cc. of a 12.5% brine solution. Sufficient 0.5% sulphuric acid was then added dropwise to the vigorously stirred latex to reduce the pH to 4.0, thus effecting coagulation. The crumb was filtered, washed with distilled water until free from chloride, dried under vacuum at 50° C., and sheeted off on a rubber mill to a thickness of 3 to 4 millimetres. The sheets were then cut into rectangles of a suitable size for Wallace plasticity determination, and placed on aluminium sheets in an air-draught oven at 100° C. Samples were withdrawn at intervals and their plasticity determined. The results shown graphically in the accompanying drawing include the results of comparative tests on tri(nonylphenyl)phosphite, a commercially available phosphite stabiliser. In the drawing, the various curves correspond to stabilisers as follows:

| Curve: | Stabiliser |
|---|---|
| 1 | Tri(nonylphenyl)phosphite—freshly prepared emulsion. |
| 2 | Tri(nonylphenyl)phosphite—emulsion after storage. |
| 3 | Phosphite of Example 14—freshly prepared emulsion. |
| 4 | Phosphite of Example 14—emulsion after storage. |
| 5 | Phosphite of Example 15—freshly prepared emulsion. |
| 6 | Phosphite of Example 15—emulsion after storage. |
| 7 | Phosphite of Example 16—freshly prepared emulsion. |
| 8 | Phosphite of Example 17—freshly prepared emulsion. |
| 9 | Phosphite of Example 18—freshly prepared emulsion. |

It is intended to cover all changes and modifications of the examples of the invention herein chosen for purposes of disclosure which do not constitute departures from the spirit and scope of the invention.

What is claimed is:

1. A composition comprising unvulcanized styrene-butadiene rubber and a stabilizing amount of a stabilizer for the rubber, substantially non-discoloring consisting essentially of a phosphite ester monomer having the formula (RO)P(OR')$_2$ in which R is 4-(4'-hydroxyphenylthio) phenyl and R' is nonylphenyl.

2. A composition comprising unvulcanized styrene-butadiene rubber and a stabilizing amount of a stabilizer for the rubber, substantially non-discoloring consisting essentially of a phosphite ester monomer having the formula (RO)P(OR')$_2$ in which R is 2-(2'-hydroxyphenylthio)phenyl and R' is phenyl.

References Cited

UNITED STATES PATENTS

| 3,112,286 | 11/1963 | Morris et al. | 260—45.95 |
| 3,255,136 | 6/1966 | Hecker et al. | 260—45.95 |
| 3,297,631 | 1/1967 | Bowm et al. | 260—45.95 |
| 3,405,073 | 10/1968 | Abramoff | 260—45.95 |
| 3,406,135 | 10/1968 | Hecker et al. | 260—45.95 |
| 3,435,097 | 3/1969 | Bottomley et al. | 260—45.95 |
| 3,159,533 | 12/1964 | Nelson | 260—976 |
| 3,415,907 | 12/1968 | Sconce et al. | 260—976 |

HOSEA E. TAYLOR, JR., Primary Examiner

U.S. Cl. X.R.

260—29.7, 976, 895